United States Patent [19]

d'Acremont

[11] 3,940,910

[45] Mar. 2, 1976

[54] ROTARY MOWER

[75] Inventor: Alain Marie Charles d'Acremont, Morey St. Denis, France

[73] Assignee: Sperry Rand France, S.A., Longvic, France

[22] Filed: May 6, 1974

[21] Appl. No.: 467,434

[30] Foreign Application Priority Data
May 21, 1973  United Kingdom.............. 24093/73

[52] U.S. Cl. .............................................. 56/14.4
[51] Int. Cl.² .......................................... A01D 43/00
[58] Field of Search ............ 56/500, 503, 504, 505, 56/DIG. 1, 13.3, 14.4, 17.4, 17.5, 16.2, 221, 222, 226, 364, 220, 127

[56] References Cited
UNITED STATES PATENTS

| | | | |
|---|---|---|---|
| 3,093,951 | 6/1963 | Barows et al. ........................ | 56/12.7 |
| 3,596,445 | 8/1971 | Lievers et al. .................... | 56/DIG. 1 |
| 3,698,162 | 10/1972 | Scarnato et al. ..................... | 56/14.4 |

*Primary Examiner*—Louis G. Mancene
*Assistant Examiner*—Peter K. Skiff
*Attorney, Agent, or Firm*—John R. Flanagan; Frank A. Seemar; Joseph A. Brown

[57] ABSTRACT

A rotary mower mechanism of the type having a plurality of rotatable cutter units on a transversely extending cutter bar supported on skid means. Each cutter unit is provided with at least one blade operatively extending between the skid and a guard mounted over the cutter bar to provide protection and aid in the conveyance of cut crop material in a rearward direction. A rotatable crop conveyor assembly is provided to sweep crop material across the area of the cutter bar and facilitate its conveyance in a rearward direction for eventual discharge. The mower mechanism also includes rearwardly disposed crop conditioner means adapted to operate on the crop prior to discharge thereof to the ground.

17 Claims, 7 Drawing Figures

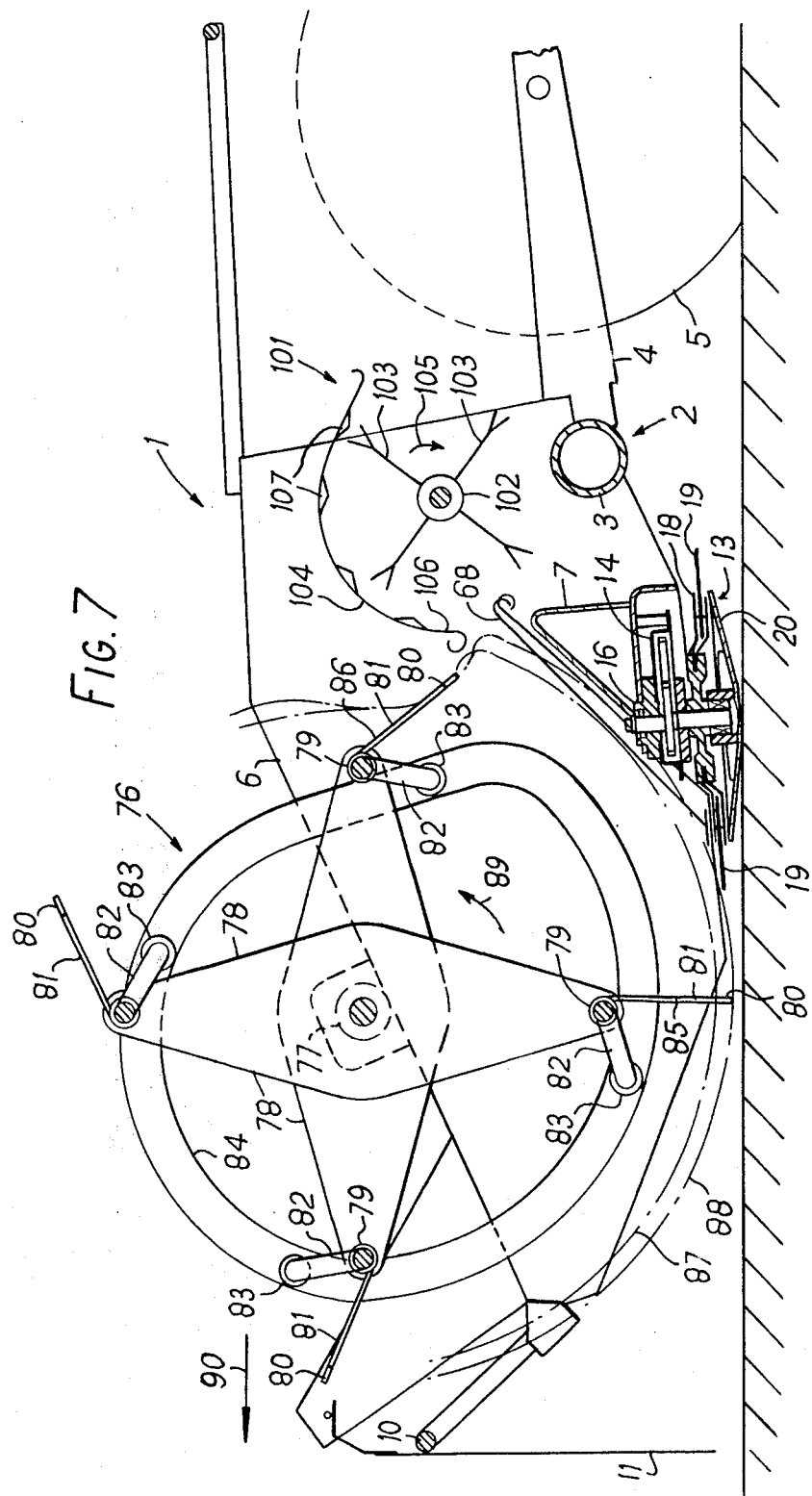

ROTARY MOWER

This invention relates to rotary mowers for agricultural use and more particularly to rotary mowers of the type having at least two rotatable cutter units mounted side-by-side and each supporting at least one cutter blade to cut standing crop during forward movement of the mower. The invention is particularly useful when applied to a combined rotary mower and crop conditioner, hereinafter referred to as a "mower conditioner". The terms "forward" and "rearward" used throughout the specification are with respect to the direction of movement of the machine in operation.

Some rotary mowers currently in use have a cutter bar comprising a housing which accommodates the drive means for the rotary cutter units. In the operative position, the cutter bar housing extends substantially parallel to the ground and in a transverse direction relative to the forward operative movement of the mower. The rotatable cutter units are arranged substantially coplanar on top of the housing and in side-by-side relationship, whereby the cutter units are driven from below. Each cutter unit normally comprises a shaped structure supporting at its outer periphery at least one cutter blade. The trajectories of the cutter blades normally overlap each other at a location substantially in front of the drive housing in order to ensure a clean cutting action over the whole width of the cutter bar. The cutter blades operate as impact cutters and in order to provide for sufficiently strong cutting impacts, the rotational speed of the cutter units is relatively high. After being cut, the crop falls on top of the cutter units, the rotational movement of which ensures the discharge of the mown crop in a rearward direction relative to the cutter bar.

Although the capacity of rotary mowers is considerably greater than conventional reciprocatory sickle bar mowers, known rotary mowers still suffer many disadvantages. For example, in the underdriven type of mower discussed above, the drive housing forms the lowermost portion of the cutterbar, and is held close to the ground to maximise the quantity of mown crop. Since the crop to be mown is usually a green crop having a high moisture content and since the crop is often wet from rain or dew, there is a tendency for pieces of mown crop and/or dirt (soil, mud, etc.) to build up at the forward edge of the drive housing and to adhere thereto, particularly at the point where the trajectories of the cutter blades of two neighbouring cutter units overlap each other. This build-up also occurs at the location where the cutter blades move towards each other or at the locations where the cutter blades move away from each other. When these accumulations of crop and/or dirt are sufficient to extend beyond the points of intersection of the cutter blade trajectories, the standing crop can no longer come within the reach of the cutter blades because the accumulations deflect the standing crop in forward direction, whereby the cutter blades pass thereover. As a result, one or more strips of uncut crop are left which is a waste of valuable crop and which often causes problems during the subsequent haymaking operations with hay tools such as tedders, rakes and balers.

This problem of so-called "stripping" is aggravated by the fact that the cutter bar often strikes mole hills, etc., the resulting spread of soil tending to increase the risk of dirt build-up on the forward edge of the cutter bar and also tending to pollute the mown crop.

Due to the high rotational speed of the cutter units, the cutter blades often hit the stems of the crops several times before the crop is discharged rearwardly of the cutter bar. Accordingly, a considerable portion of the crop becomes chopped into small pieces and apart from the increased risk of accumulation of this material on the cutter bar drive housing, this also constitutes another disadvantage in that the volume of useful crops is reduced. The risk of crop becoming chopped is especially great when difficult crop conditions are met, such as, for example, a heavy crop, an extremely wet crop, a flattened crop, or an entangled crop.

Another disadvantage resides in the fact that at the rearward edge of the cutter bar the crop can again contact the rotating cutter blades while being discharged, whereby another undesirable chopping action results giving rise to wasted crop.

Considerable power is consumed by these undesirable chopping actions. Also the rotation of the cutter units creates considerable air turbulencies which tend to deflect the crop in a forward direction which prevents the mower from cutting the crops in a clean and even manner.

When the crop is flattened or entangled, for example as a result of bad weather conditions, a clean and even cut is often very difficult, if not impossible, to attain, as the cutter blades do not cut low enough with respect to the ground. This results in the crop being mown in inappropriate lengths, if it is cut at all.

In another arrangement of rotary mower, the rotatable cutter units are mounted underneath the transversely-extending cutter bar drive housing, i.e. they are driven from the top instead of from beneath. The drive housing is extended in a forward direction by means of stationary shields completely covering the rotary cutter units except for the cutter blades thereof. A rearwardly and upwardly extending rake member is arranged substantially above the stationary drive housing and a first crop conveyor rotor is arranged on top of the rake member substantially above the centre line of the cutter bar, while a second crop conveyor rotor extends substantially behind the first conveyor. Both rotors are intended to convey the crop rearwardly in cooperation with the rake member. However, the rotors and the rake member have a very complicated structure and fail to provide for a continuous and even flow of crop towards the rear of the cutter bar. In addition, there still remains a "dead" zone between the forward edge of the cutter bar at which the crops are cut and the most forwardly extending rotor. As a result, the crop is not conveyed in a rearward direction immediately after being cut, whereby the crop is chopped to some extent and the movement thereof becomes very irregular.

Also, again no satisfactory mowing operation can be obtained in flattened and/or entangled crops as the cutter blades tend to move above the crop. Furthermore, the rotary cutter units also create considerable air turbulencies which tend to deflect the standing crop in a forward direction preventing, as already discussed, an even and clean cut, particularly when a short crop is to be mown. Also, this type of mower attracts the problem arising out of the striking of mole hills or other mounds of soil. Finally, as the rotating cutter units inevitably contact the ground and as these units are rotated at high speeds (for example of the order of 3000 r.p.m.) they are subject to exceptionally fast wear.

Mower conditioners having rotary type mower means are in use and each has a cutter bar which is principally similar to the underdrive rotary mower discussed above. As a result, all the disadvantages which are characteristic of such rotary mowers also apply to these mower conditioners. In addition, mower conditioners have other disadvantages.

In one mower conditioner, the actual conditioner means comprise a large transversely-extending conditioning roll which is cooperable with a stationary curved shield. This conditioning roll extends substantially above the rotary cutter units of the cutter bar at a location slightly offset to the rear thereof and is rotated clockwise as seen in end view with the roll located to the right of the cutter bar. Due to this particular arrangement, the generally horizontal movement of the crop towards the rear of the cutter bar is abruptly changed into a generally vertical movement around the conditioner roll. This causes a hesitation in the movement of the crop, whereby the risk of the crop being chopped by the rotating cutter blades is further increased. The fluent movement of the crop is also hindered thereby, which results in an inadequate conditioning of the crop.

Other mower conditioners comprise a pair of conditioning rolls which extend one above the other at a location generally behind the rear edge of the cutter bar and are driven in opposite directions in such a manner as to pass the mown crop therebetween and then discharge it rearwardly of the machine. A stationary guide plate is usually arranged between the discharge end of the cutter bar and the intake end of the conditioner means. Since there is no positive feeding of the mown crop to the conditioner means from the mower means, the flow of crop to the conditioner means may be uneven instead of being continuous. Again under such circumstances, the cut crop may become chopped to some extent by the rotating cutter blades and inadequate conditioning may take place.

In an attempt to ensure a fluent and continuous feeding of the crop from the mower means to the conditioner means, some mower conditioners have been provided with a transversely-extending reel which is positioned substantially above the rear edge of the mower means and above the stationary guide plate in order to provide positive crop conveying means to convey the crop in an even pattern from the mower means to the conditioner means. In this arrangement, the crop is first accelerated by the cutter units and conveyed towards the reel and the stationary guiding plate. At the transition between the mower means and the guide plate there may still occur some hesitation in the movement of the crop, whereby again there is a risk of the crop being chopped.

It is known to provide mower conditioners with a conventional reciprocatory sickle bar and with a reel extending substantially above the forward edge of the sickle bar. In this arrangement, the reel is operative to convey the crop rearwardly from a location where it is cut towards the conditioning means. In addition, this reel is also intended to keep forwardly-extending fixed knife guards free from any substantial build up of material. However, the lower portions of the sickle bar structure are stationary and out of the reach of the reel, whereby dirt may accumulate thereon resulting in jamming of the cutter bar. As is well known, such sickle bar type mowers have a maximum capacity which is substantially below the maximum capacity of rotary type mowers and, therefore, the latter type is more desirable than the former, provided the disadvantages of rotary mowers referred to can be eliminated.

It is the principle object of the present invention to overcome or to attenuate one or more of the aforementioned disadvantages of rotary type mowers and mower conditioners employing such mowers.

According to the present invention a rotary mower comprises a cutter bar, at least one skid for supporting the cutter bar, and a guard mounted over the cutter bar, the cutter bar comprising at least one rotatable cutter unit having at least one cutter blade, each cutter unit being located between the, or each, skid and the guard, and the trajectory of the outermost end of each cutter blade extending beyond the forward edges of the, or each, skid and the guard.

Preferably, the cutter bar comprises a transversely-extending housing having a plurality of rotatable cutter units mounted on the lower side thereof and in use driven by drive means located within the housing. A skid may be provided below each of the cutter units and each skid is preferably made freely rotatable. The guard is stationary and extends over the total width of the cutterbar, only the trajectories of the outermost ends of the cutter blades projecting beyond the freely rotatable skids and the stationary guard at the forward edges thereof. The rotatable cutter units may be of any shape but are preferably substantially flat and oval-shaped in plan view. The freely rotatable skids may have substantially the same diameter as the major diameter of the oval cutter units and are arranged concentrically one above the other. The forward edge of the guard may be scalloped, the radius of curvature of each portion being substantially the same as that of the skids and the forward edges of said portions being aligned vertically with that of the respective skids.

Preferably crop conveyor means are rotatably arranged substantially above the forward edge of the cutter bar, the crop conveyor means being operable to raise flattened crop before being cut, to sweep the crop towards the cutter bar, and to convey cut crop rearwardly over the stationary guard for discharge to the ground immediately after being cut, thereby preventing any chopping of the cut crop.

The crop conveyor means may be in the form of a reel structure having cam-actuated transverse slats supporting tines, the cam means being operable angularly to adjust the slats, and hence the position of the tines, such that the tines positively engage the crop forwardly of the cutter bar, feed it to the cutter bar for cutting, then convey the cut crop in a rearward direction over the guard immediately after being cut, and finally release the cut crop.

The rotary mower may form part of a mower conditioner in which case crop conditioner means are provided rearwardly of the cutter bar for operating on the cut crop prior to discharge thereof to the ground.

The conditioner means may comprise a pair of oppositely driven and cooperable conditioner rolls and the guard may extend from the forward edge of the cutter bar to slightly below and short of the nip of the rolls. Alternatively, the conditioner means may comprise an impacting rotor or beater with a cooperating shield.

In the case of a mower conditioner, the crop conveyor means are arranged to release the cut crop adjacent the conditioner means, such as at the nip of the conditioner rolls when these are employed, or at the intake region of the impacting rotor and associated shield when these are employed.

During operation of the mower, the freely rotatable skids may engage the ground and are rotated in one or other direction as soon as any resistance is met and as soon as there is a tendency for cut crop and/or dirt to accumulate and adhere thereto, whereby such accumulation is prevented. The reel structure is operable to raise any flattened crops and to force all crop into contact with the cutter blades. As soon as the crop is cut, it is conveyed out of the reach of the cutter blades on to the stationary guard, and further conveyed rearwardly and upwardly over the guard for discharge in case of a rotary mower and towards the conditioner means in the case of a mower conditioner. All components driven at relatively high speed, except for the portions of the cutter blades which extend beyond the skids and guard, are shielded by the skids and guard, whereby adverse influences thereof on the crop and the harvesting operation are eliminated, or at least attenuated.

Rotary mowers in accordance with the invention and mower conditioners employing the same in addition to preventing any accumulation of material thereon and any chopping of the cut crop also provide a clean cut of the crop over the whole width of the cutter bar even under the most adverse crop conditions. Furthermore the cut crop is continuously and fluently conveyed rearwardly which results in an even and adequate conditioning with minimum power requirements.

Two mower conditioners with a cutter bar of the rotary type embodying the present invention will now be described in greater detail, by way of example, with reference to the accompanying drawings, in which:

FIG. 5 is an enlarged elevational view of one component of the mower conditioner indicated at V in FIG. 2, FIG. 7 is a view similar to FIG. 1 of the second mower conditioner.

Figure 1:
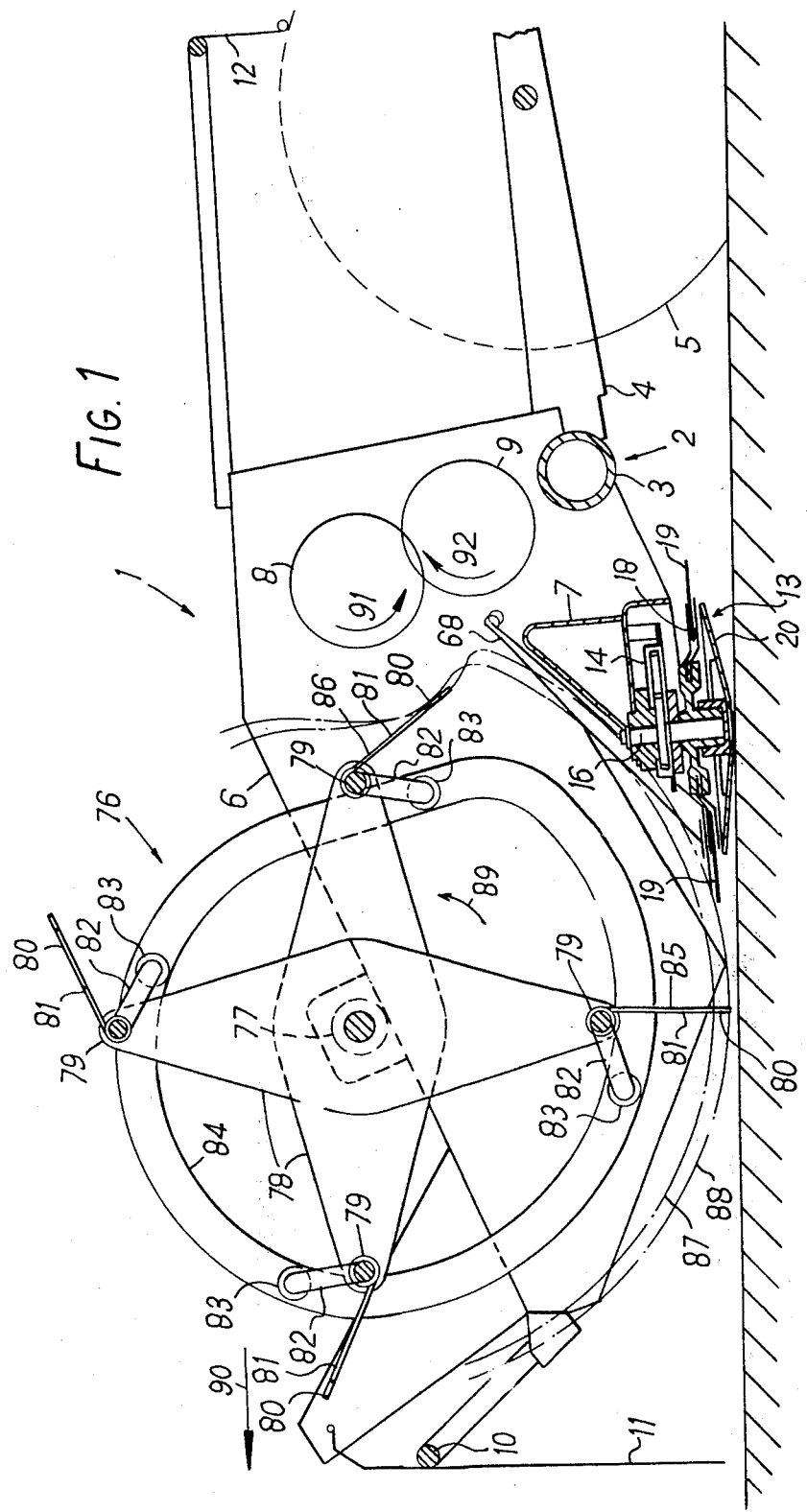
FIG. 1 is a somewhat diagramatic cross-sectional view of the first mower conditioner.

With reference to FIGS. 1 to 6, the mower conditioner is indicated generally at 1 and comprises a chassis 2 having a transversely-extending main beam 3 and rearwardly extending arms 4 secured thereto to support the whole structure on rearward ground-engaging wheels 5. The chassis 2 further comprises fore-and-aft extending side-walls 6 which are arranged to support a secondary transversely-extending beam 7, conditioner rolls 8, 9, a forward deflector rod 10, a forward protective curtain or skirt 11 and a rearward deflector shield 12. The mower conditioner further comprises a forwardly-extending tongue or hitch (not shown) and drive means (also not shown) for attaching the mower conditioner to a pulling tractor and to transmit driving motion from the tractor to the components of the mower conditioner.

The mower conditioner further comprises a cutter bar of the rotary type which is generally indicated at 13 and comprises a housing or supporting casing 14 secured to the lower edge of the secondary transverse beam 7 and accommodating drive means generally indicated at 15. The drive means 15 comprise a number of generally vertically-extending shafts 16 which extend through openings in a base plate 17 of the casing 14 in downward direction and are arranged to support cutter units 18 each having pivotally connected thereto a pair of cutter blades 19. The shafts 16 further support at their lower free ends freely rotatable ground-engaging skids 20. The casing 14 extends over the total width of the mower conditioner and protrudes, at the side of the tongue, beyond the associated side wall 6. At this end of the casing 14, which is indicated at 21 in FIG. 3, a vertical input shaft 22 extends upwardly through a top plate 23 of the casing 14 and is operatively arranged to receive driving motion from the main drive transmission (not shown). The input shaft 22 supports a first gear 24 inside the casing 14 which meshes with a reversing gear 25 which in turn meshes with a second reversing gear 26. The drive transmission 15 inside the casing 14 further comprises gears 27 secured to respective shafts 16, and intermediate reversing gears 28, 29 which are operative to transmit and reverse the drive motion from one shaft 16 to the neighbouring shaft 16. Accordingly, the cutter units 18 are driven in opposite direction as indicated by the arrows 30, 31 in FIGS. 3 and 4.

Figure 2:
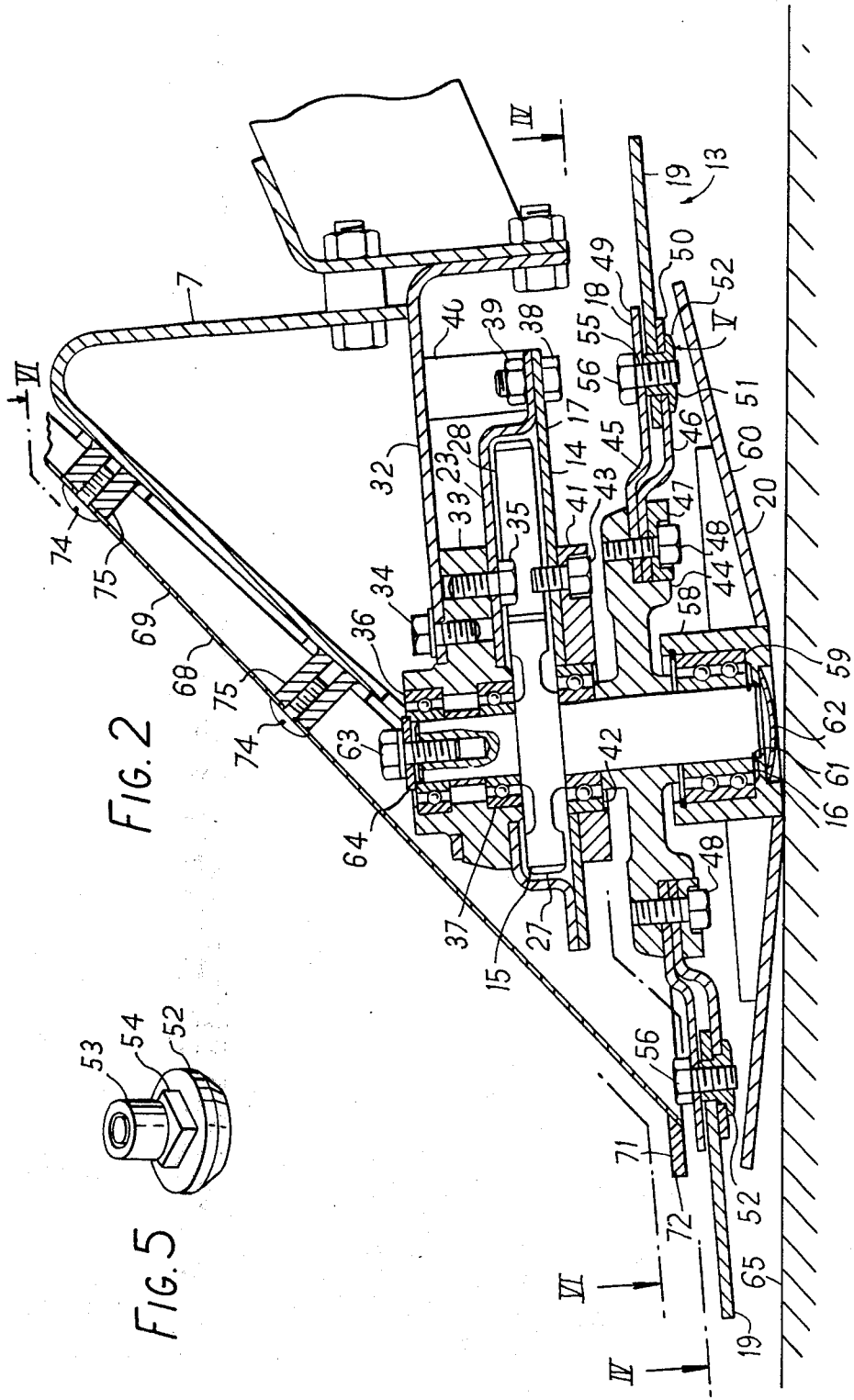
FIG. 2 is an enlarged sectional view, similar to FIG. 1, of only a portion of the mower conditioner.

Referring to FIG. 2, the secondary transversely-extending beam 7 comprises a generally flat and horizontally-extending member 32 arranged to support a bearing member 33 for each shaft 16 by means of bolts 34, each bearing member also being bolted at 35 to the top plate 23 of the casing 14. Ball bearings 36 and 37 are seated inside each bearing member 33 to bear the top end of the associated shaft 16. The base plate 17 of the casing 14 is in turn bolted to the top plate 23 by bolts 38 of which alternate ones are arranged to cooperate with nuts 39 and the remainder arranged to cooperate with tapped extensions 40 of the beam 7. A series of second bearing members 41 having bearings 42 is secured to the base plate 17 of the casing 14 by means of bolts 43 and each bearing 42 bears an intermediate portion of the associated shaft 16. The bearing members 33 and 41, the bearings 36, 37 and 42, the shafts 16 and the base and top plates 17 and 23 of the casing 14 are assembled and sealed in such a manner that the casing 14 is operative to hold oil to ensure a smooth running and long life of the components of the drive transmission 15.

Cutter unit support members 44 are keyed to respective shafts 16 at a location substantially below the base plate 17 of the casing 14. Upper and lower generally oval-shaped (as seen in plan view) cutter blade supporting members 45, 46 are secured to the members 44 by a retaining ring 47 and bolts 48. The cutter blade supporting members 45, 46 have outer cranked sections 49, 50, the crank of the lower member 46 being greater than the crank of the upper member 45, whereby a free space is created between the two members 45, 46 when assembled. The cutter blades 19 are mounted in this free space and pivot therewithin when in use they strike an obstruction. The section 50 of the lower cutting blade supporting member 46 has a square-shaped aperture 51 which is operative to hold a specially-shaped cutter blade retaining nut 52 comprising a generally cylindrical body portion 53 and a square collar 54 as seen in FIG. 5. The square collar 54 cooperates with the complementary shaped aperture 51 in the section 50 to prevent any rotational movement of the nut 52, the cylindrical body portion 53 being operative to hold, and provide the pivot for, the cutter blade 19. The section 49 of the upper cutter blade supporting member 45 has two circular apertures 55 which receive bolts 56 for cooperation with respective nuts 52 to hold the latter in the operative position. When assembled, the cutter blades 19 are freely pivotable with clearance around the cylindrical body portions 53 of the nuts 52. Removal and replacement or reversal of the cutter blades 19 is easily accomplished from the rearward edge of the cutter bar 13 at a location substantially below the beam 7 as it is only necessary to unscrew the bolts 56 and take out the nuts 52. The cutter blades are bevelled on opposed edges so that they may be reversed when one edge becomes blunt, as is conventional.

As already mentioned, the shafts 16 support at their lower ends freely rotatable supporting skids 20. Each skid 20 comprises a generally cylindrical central boss 58 (FIG. 2) by which the skid is mounted on the associated shaft 16 via a bearing 59, and a dished circular ground-engaging body portion 60. Each bearing 59 is held in position on its shaft 16 by a retaining ring 61 while the bearing 59 is sealed from dust etc. at the lower end by a sealing member 62 which forms a cap for the lower end of the shaft 16 and sits in the lower end of the boss 58 over which the body portion 60 does not extend.

The major diameter of the cutter blade supporting members 45, 46 is slightly less than the diameter of the skids so that they are protected by the latter. The cutter blades 19 can pivot in such a manner as also to lie completely within the radius of the skids 20 although in the normal operative cutting position, the cutter blades 19 extend beyond the outer circumference of the skids 20.

Figures 3, 4, 6:
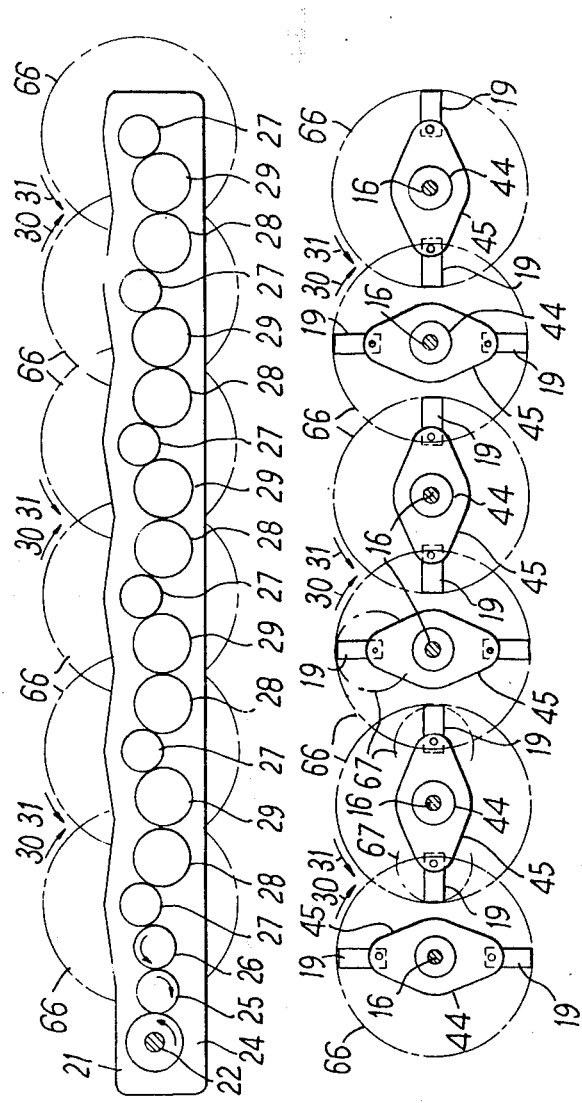
FIG. 3 is a diagramatic plan view of drive means for the cutter bar.
FIG. 4 is a diagramatic fragmentary view taken along the line IV—IV of FIG. 2.
FIG. 6 is a fragmentary top view taken along the line VI—VI of FIG. 2.

Bolts 63 and washers 64 ensure that the shafts 16 are held in position relative to the respective bearing members 33. In the operative position, the cutter bar 13 is slightly downwardly inclined in a forward direction with respect to the ground line which is generally indicated at 65. It should be noted that the trajectories 66 of the outer ends of the cutter blades 19 of adjacent cutter units 18 overlap each other to a considerable extent. This is made possible by the provision of oval-shaped cutter blade supporting members rather than circular shaped members for example, and the timing of the cutter units. Adjacent cutter units 18 are assembled 90° out of phase with each other as shown in FIG. 4 and are maintained in these relative positions by the drive gears 25, 26 and 27 so that in operation one unit cannot foul an adjacent unit. The trajectory of the outer end of a cutter blade 19 when it pivots around the pivot points formed by the associated nut 52 has been indicated at 67 in FIG. 4.

A stationary guard 68 is arranged above the cutter bar 13 in a generally upwardly and rearwardly extending direction between the forward end of the cutter bar 13 and the nip of the conditioner rolls 8, 9. The guard 68 comprises flared, (from top to bottom), convex sections 69 (as seen in FIG. 6) having lower arcuate edges 70 positioned above and towards the forward edge of the respective cutter units 18. Arcuate forward sections 71 are welded to the arcuate edges 70, the sections 71 being substantially flat, and generally parallel to the cutter units 16, and extending in forward direction with forward edges 72 of substantially the same radius as the freely rotatable skids 20. The forward edges 72 of the sections 71 are positioned substantially concentrically with the respective skids 20 but slightly vertically offset therefrom to accommodate the protrusion of the cutter blades 19. With this arrangement, the cutter blade supporting members 45, 46 are completely shielded from any direct contact with the crop, while the cutter blades 19 only protrude beyond the shielding members formed by the guard 68 and the skid members 20 at small operative cutting sections in front of the cutter bar 13. The sections 69 of the guard 68 are spaced from each other by generally flat triangularly-shaped sections 73. The guard 68 is secured to the secondary transversely-extending beam 7 by round head screws 74 and spacers 75. The upper edge of the protective guard 68 is substantially rectilinear and is arranged slightly below but in close relationship to the nip of the conditioner rolls 8, 9.

The mower conditioner further comprises a crop conveyor 76 (FIG. 1) formed by a rotatable reel structure comprising a central core 77 carried by the side walls 6, a number of radially-extending supports 78 secured thereto at the outer ends thereof, and transverse slats 79 pivotally borne by the supports 78. Each slat 79 carries a series of long tines 80 and a series of short tines 81. The long tines 80 are positioned along each slat 79 so as to be generally aligned with the flat triangularly-shaped sections 73 of the guard 68, while the short tines 81 are aligned with the convex sections 69. This arrangement ensures a close relationship between all the tines 80, 81 and the whole surface of the guard 68. In addition, the reel 76 is also positioned in close relationship to the forward edge of the cutter bar 13 and to the intake side of the conditioner rolls 8, 9.

Each slat 79 is connected at one end to a crank shaft 82 having a cam follower 83 which is arranged to ride in a cam track 84 which is secured to one of the side walls 6. The cam track 84 and the cam followers 83 are operative to pivot the slats 79 from a crop-engaging or conveying position 85 when located above the forward end of the cutter bar 13 and the protective guard 68, to a crop-releasing position 26 when located generally at the nip of the conditioner rolls 8, 9. The trajectories of the outer ends of the tines 80 and 81 are partially indicated by broken lines 87 and 88, respectively. The direction of rotation of the reel 76 is indicated by arrow 89. Arrow 90 indicates the direction of forward operative movement of the mower conditioner, and arrows 91 and 92 indicate the direction of contra-rotational movement of the conditioner rolls 8, 9.

With reference to FIG. 7, showing the second mower conditioner embodying the present invention, identical components are indicated by identical reference numerals. This mower conditioner also comprises a chassis 2 having a transversely-extending main beam 3 and rearwardly-extending arms 4 secured thereto to support the whole structure on rearward ground-engaging wheels 5. The structure further comprises a transversely-extending secondary beam 7, the rotary type cutter bar 13 according to the invention, the forwardly-extending crop conveyor means 76 and the upwardly and rearwardly extending guard 69 situated above the cutter bar 13. However, the conditioner rolls 8, 9 of the embodiment of FIG. 1 are replaced by impact conditioner means or beater generally indicated at 101 and comprising a single rotor 102 with a plurality of flails 103, in the form of radially-extending arms with forked ends, and a cooperating arcuate shield or guide 104 extending over the rotor and helping to convey or guide the cut crop rearwardly of the machine in cooperation with the rotor. The rotor 102 is rotated in the direction of arrow 105. The forward edge 106 of the shield 104 extends slightly above and in front of the rear edge of the guard 68 so as to provide a continuous and uninterrupted passage for the crop from above the guard 68 to the rotor 102. V-section conditioner elements 107 are arranged on the inner side of the shield 104, which elements act as auxiliary conditioner means to the rotor 102. The elements 107 extend substantially parallel to the axis of the rotor 102.

In operation the mower conditioner 1 is pulled through a field of standing crop material by a tractor with power being supplied to run the machine from the usual tractor power take-off shaft. The input power is transferred to the various drive mechanisms in a conventional manner and the individual components are driven as hereinbefore described. The cutter bar 13 is positioned in inclined, close operative relationship with respect to the ground line 65 and is moved in the direction 90. The freely rotatable skid members 20 engage the ground in this operative position of the cutter bar 13 whereby upon encountering any resistance, they rotate in one or other direction, thus preventing any accumulation of cut crop and/or dirt thereon. When any obstacles are encountered, the skids 20 ensure that the cutter bar 13 is raised so as to pass over the obstacle. The cutter units 18 are rotated at about 3000 r.p.m., thereby ensuring that the cutter blades 19 cut the crop material by impact as the mower conditioner traverses the field. The reel 76 which is mounted above the cutter bar 13 engages the crop material and is operative to hold it within the reach of the cutter blades 19 during the cutting operation and to raise flattened crop material, where applicable, prior to being cut. As soon as the crop material is cut, it is deposited on top of the guard 68 out of the reach of the cutter blades 19, whereby chopping of cut crops is minimised, if not obviated. Referring to the embodiment of FIGS. 1 to 6 the tines 80, 81 are operative continuously to sweep the cut crop material away from the cutting location in upward and rearward direction over the guard 68 towards the conditioner rolls 8, 9 thereby ensuring a continual clearing of cut crop material at the forward edge of the cutter bar 13 and a fluent feed thereof to the conditioner rolls 8, 9. At the nip of the conditioner rolls 8, 9 the tines 80, 81 are pivoted to the crop-releasing position 86, so that the crop can enter the nip and pass between the two rolls, the upper one 8 of which is resiliently urged towards the lower one 9. The conditioner rolls 8, 9 crush and crack the crop material in a conventional manner. As the crop material leaves the rolls 8, 9 it passes downwardly under the deflector plate 12 and is deposited in a relatively wide fluffy swath readily to permit drying of the conditioned material. The surfaces of the rolls 8 and 9 may be fluted and arranged to mesh one with the other. Alternatively, one roll may be plain and the other fluted, or both rolls may be plain.

Referring to the embodiment of FIG. 7, the tines 80, 81 are pivoted to the crop releasing position 86 at the forward edge 106 of the shield 104 (i.e. at the intake region of the rotor 102) so that the crop can enter the space between the rotor 102 and the shield 104 and pass therebetween. The flails 103 beat on the crop and throw it against the conditioner elements 107 at the inner side of the conveyor guard 104, whereby it is thoroughly crushed and cracked, i.e. conditioned. As the crop material leaves the conditioner means 101 it is deposited in a relatively wide fluffy swath readily to permit drying of the conditioned material. The conditioner means 101, and more particularly the shield 104, are positioned relative to the discharge end of the protective guard 68 in such a manner so as to provide a smooth transition for the crop from the protective guard 68 to the space between the rotor 102 and the shield 104.

A mower or mower conditioner constructed in accordance with the invention is especially advantageous over the prior art as it ensures a clean and even cut of crop without leaving any strips of uncut material, even under the most adverse conditions such as heavy, entangled, wet or flattened crops. This is mainly due to the fact that no accumulation of foreign material on the cutter bar can occur. The cut crop is continuously and fluently cleared away from the fast rotating cutter components, whereby any desired chopping action on the crop is prevented and hence substantially no crop losses occur while minimising power requirements. Due to the special arrangement whereby the fast rotating cutter components, except the cutter blades 19, are "sandwiched" between the stationary guard 68 and the freely rotatable skids 20, no adverse air turbulencies are created. Also when mole hills are encountered, for example, only the cutter blades 19 make contact therewith so that the resultant spreading of the soil is minimised compared with known machines in which the whole of the cutter units are contactable by the soil which is accordingly scattered to a greater extent.

The arrangement of an elongated cutter bar and elongated conditioner means associated therewith, ensures that the mat of crop material is conditioned over a width which substantially corresponds with the cutting width of the machine. Hence the mat of crop is comparatively thin when being conditioned. This results in an excellent conditioning operation which would not normally be obtained when conditioning a thicker mat as in known machines.

The skirt 11 is made up of a number of strips of rubber or other flexible material and serves to protect the tractor driver from stones or other hard objects that may be flung up by the cutter blades 19. However, the skirt 11 need not be employed. The rod 10 serves to deflect tall crop forwardly prior to mowing which facilitates the actual cutting operation.

Modifications and alterations to the described preferred embodiment of the invention may be made. For example, a rotary mower similar to the aforedescribed structure but without the conditioner rolls 8, 9 may be provided for use as mower means only. In a modified embodiment of such a rotary mower, the reel structure 76 may have a reduced diameter, but will still extend substantially above the forward edge of the cutter bar and will be operative to sweep crop to the cutter bar and convey cut material in rearward direction over a stationary guard provided over the cutter units. Also the position of the reel 76 relative to the cutter bar 13 may be made adjustable by means of hydraulic cylinders, for example. Furthermore, the freely rotatable ground engaging skids 20 may have an upturned periphery to reduce the risk of dirt etc. entering between the skids 20 and the guards 68. Circular baffle elements or labyrinth flanges may be provided on the movable components such as the skids 20 and the support members 44, and the stationary components such as the underside of the casing 14, in order to protect the various bearings against the ingress of dust, etc.

What I claim is:

1. A rotary mower comprising:
   a. a cutter bar comprising at least one rotatable cutter unit having at least one cutter blade, said cutter unit being substantially flat and oval-shaped in plan view;
   b. at least one skid for supporting the cutter bar, one skid being provided below each said cutter unit and being freely rotatable, said skid further being circular in plan view and generally concentrically arranged with said cutter unit and having substantially the same diameter as the major diameter of the oval cutter unit;
   c. a guard mounted over the cutter bar, said guard having a forward edge portion being aligned vertically with that of each respective skid, said forward edge portion of the guard being scalloped and having a radius of curvature substantially the same as that of the respective skid;
   d. said cutter unit being located between a respective skid and the guard and the trajectory of the outermost end of each cutter blade extending beyond the forward edge portions of the respective skid and the guard; and
   e. crop conveyor means arranged substantially above the forward edge portions of the guard and the cutter bar and being operable to sweep crop towards the cutter bar and to convey cut crop rearwardly over the guard.

2. A rotary mower as set forth in claim 1, wherein each of the scalloped forward edge portions of the guard is formed from flat arcuate members attached to the respective lower arcuate edges of flared convex portions of the guard so that they are disposed substantially parallel to the cutter units, the convex portions being joined together by generally flat triangular portions.

3. A rotary mower comprising:
   a. a cutter bar comprising at least one rotatable cutter unit having at least one cutter blade;
   b. a least one skid for supporting the cutter bar;
   c. a guard mounted over the cutter bar;
   d. said cutter unit being located between the skid and the guard and the trajectory of the outermost end of each cutter blade extending beyond the forward edges of the skid and the guard; and
   e. crop conveyor means arranged substantially above the forward edges of the guard and the cutter bar and being operable to sweep crop towards the cutter bar and to convey cut crop rearwardly over the guard, said crop conveyor means being in the form of a reel structure having peripherally-arranged transverse slats supporting tines and actuated by cam means, said cam means being operable angularly to adjust the slats, and hence the position of the tines, such that the tines positively engage the crop forwardly of the cutter bar, feed it to the cutter bar for cutting, then convey the cut crop in a rearward direction over the guard immediately after being cut, and finally release the cut crop.

4. A rotary mower as set forth in claim 3, wherein said crop conveyor means is further operable to raise flattened crop before being cut.

5. A rotary mower as set forth in claim 3, wherein the cutter bar further comprises a transversely extending housing having a plurality of rotatable cutter units mounted on the lower side thereof and including means located within the housing for driving said cutter units.

6. A rotary mower as set forth in claim 3, wherein the guard is stationary and extends over the total width of the cutter bar, and wherein only the trajectories of the outermost ends of the cutter blades project beyond the skids and the guard at the forward edges thereof.

7. A rotary mower as set forth in claim 3, wherein one end of each slat is connected to a crank shaft provided with a cam follower arranged to ride in a cam track.

8. A rotary mower, as set forth in claim 3, and further comprising crop conditioner means disposed rearwardly of the cutter bar and the guard and operable on the cut crop prior to discharge thereof to the ground.

9. A rotary mower as set forth in claim 8, wherein the conditioner means comprise a pair of oppositely driven and cooperable conditioner rolls, and wherein the guard extends from the forward edge of the cutter bar to slightly below and short of the nip of the conditioner rolls.

10. A rotary mower as set forth in claim 9, wherein the crop conveyor means is arranged so that the cut crop is released at the location of the nip of the conditioner rolls.

11. A rotary mower, as set forth in claim 8, wherein the conditioner means comprise an impacting rotary beater with a cooperating shield.

12. A rotary mower as set forth in claim 11, wherein the rotary beater comprises a core which carries a plurality of radially-extending arms having forked ends.

13. A rotary mower as set forth in claim 11, wherein auxiliary conditioner means are provided on the surface of the shield facing the rotary beater, the latter being operable to throw the crop against the auxiliary conditioner means.

14. A rotary mower, as set forth in claim 13, wherein the auxiliary conditioner means are in the form of a plurality of elements of V-section disposed substantially parallel to the axis of the rotary beater.

15. A rotary mower, as set forth in claim 3, wherein crop-deflecting means are provided forwardly of the crop conveying means and cutter bar to deflect relatively tall crop forwardly prior to being cut.

16. A rotary mower as set forth in claim 3, wherein the forward edge of the guard is scalloped, being formed from flat arcuate members attached to respective lower arcuate edges of flared convex portions of the guard so that they are disposed substantially parallel to the cutter unit, the convex portions being joined together by generally flat triangular portions.

17. A rotary mower, as set forth in claim 16, wherein some of the tines are shorter than the others, the longer tines being arranged to cooperate closely with the triangular portions of the guard, and the shorter tines being arranged to cooperate closely with the convex portions of the guard.

* * * * *